UNITED STATES PATENT OFFICE.

ERNST FISCHER, OF GRONAU, NEAR ELZE, AND PETER BERGELL, OF BERLIN, GERMANY.

PROCESS OF MAKING A NEUTRAL SODIUM SALT OF LACTALBUMIN.

941,773. Specification of Letters Patent. Patented Nov. 30, 1909.

No Drawing. Original application filed April 25, 1908 Serial No. 429,129. Divided and this application filed October 22, 1908. Serial No. 459,039.

*To all whom it may concern:*

Be it known that we, ERNST FISCHER and PETER BERGELL, citizens of the Empire of Germany, and residents of Gronau, near Elze, and Berlin, Germany, have invented certain new and useful Improvements in Processes of Making a Neutral Sodium Salt of Lactalbumin, of which the following is a specification.

This invention has reference to improvements in a process of producing a pure and neutral sodium salt of lactalbumin.

This application is a division of our application for Letters Patent of the United States for process of producing a pure and neutral sodium salt of lactalbumin, filed April 25, 1908, bearing Serial No. 429,129.

A recent discovery that lactalbumin is contained in milk in form of a neutral soluble alkali compound, that is in form of an alkali salt has resulted in the invention of new processes of producing such a compound and the present invention has for its object such a process fully described hereinafter.

It is known that lactalbumin may be obtained from skim-milk on a large scale by adding an acid, removing the casein thereby precipitated and heating the solution now free from casein whereby the lactalbumin is precipitated. The lactalbumin thus obtained forms a coagulated mass which is insoluble in water and must be dried and freed from fat before the treatment can be continued. For dissolving such lactalbumin, when in a dry condition, an excess of alkali is necessary. In general, 60 gr. of hydroxid of sodium (NaOH) will suffice for dissolving 1 kg. of dried lactalbumin which has been freed from fat. The solution is not neutral, but strongly alkaline, and special precautions must be taken for removing the excess of alkali. The applicants then discovered that the lactalbumin when precipitated from the alkaline solution by carefully adding an acid and after washing it with water can easily be transformed into a neutral alkali salt by means of a solution of sodium hydroxid containing a chemically equivalent quantity of same. 1 kg. of freshly precipitated lactalbumin then requires but 26 gr. of sodium hydroxid for effecting the transformation into a pure and neutral alkali salt. This is easily and quickly effected by means of an alcoholic solution of fixed alkali preferably of sodium hydroxid. If however the dry and fat free ordinary commercial lactalbumin is directly treated with alcoholic sodium hydroxid then some salt is formed but the resulting product is neither neutral nor uniform in composition nor is it completely soluble.

In carrying the present invention into effect we proceed substantially as follows: The ordinary commercial lactalbumin is first dissolved in an excess of alkali. 1 kg. requires about 60 gr. of sodium hydroxid. From the resulting strongly alkaline solution the lactalbumin is then precipitated by carefully adding an acid, preferably hydrochloric acid. The freshly precipitated lactalbumin is washed with water and pressed and suspended in alcohol to which is gradually added a concentrated, aqueous solution of sodium hydroxid containing 26 gr. of sodium hydroxid in the proportion of 33% of sodium hydroxid to 67% of water. The suspended freshly precipitated lactalbumin combines with the sodium hydroxid but the new product does not dissolve in the alcohol solution, it remains therein in such form that the solution may be easily removed by filtration. The remaining filtrate is neutral and the salt, after having been dried represents a neutral pure sodium compound of lactalbumin.

The above described observations and reactions establish beyond doubt that a neutral alkali salt of lactalbumin exists. The importance of recovering this substance in order to use it for feeding human beings is apparent from the fact that in the mother's milk lactalbumin is contained in a much larger quantity than in cow's milk.

In order to make the invention clear the following example is herewith given. 10 kg. of ordinary commercial lactalbumin are suspended in water and dissolved by adding a solution of sodium hydroxid containing 600 gr. of same. The solution thus obtained is neutralized by hydrochloric acid and then 130 gr. of hydrochloric acid are added in addition to the quantity required for neutralizing whereby the lactalbumin is precipitated from the clear solution in form of flakes. The precipitate and solution are then separated by filtration and the precipitate is thoroughly washed with water. Now the water is removed by means of a filtering press and the dry cake thus obtained reduced and suspended in alcohol of 90%. To this is gradually added, while constantly stirring, a concentrated aqueous solution of sodium hydroxid containing 260 gr. of the latter in the proportion of 33% of sodium hydroxid to 67% of water. After from 1½ to 2 hours the alcohol becomes neutral and is filtered off, the compound pressed again and the alcohol still adhering to the compound removed by ether. Finally the product is dried at a low temperature to evaporate the ether. The product thus obtained is reduced to a fine powder. When dissolving same it is essential to note that a large quantity of water at once added to the powder will not give a complete solution and when agitated with the water the mass will again settle at the bottom. If, however, the powder is stirred at first with a very little water until it swells and gradually more water is added while stirring a durable solution is obtained. One gr. of the sodium lactalbumin salt requires 50 gr. of water. However other concentrations may be produced and in higher concentrations the solution certainly does not flow so easily. Such solutions are distinguished from solutions of the casein salts by taking up completely the sodium lactalbumin without leaving an insoluble residue as is the case when casein salts are dissolved.

We claim as our invention:

1. The process of producing a neutral alkali salt of lactalbumin, consisting in dissolving dried, fat free lactalbumin in an excess of an aqueous solution of fixed alkali, precipitating the lactalbumin by means of an acid, separating the precipitate from the liquid, washing the freshly precipitated lactalbumin with water, removing the water, reducing and suspending the precipitate in alcohol, adding gradually a concentrated, aqueous solution of fixed alkali containing a chemically equivalent quantity of same, allowing the lactalbumin and alkali to combine and removing the neutral alcohol solution.

2. The process of producing a neutral alkali salt of lactalbumin, consisting in dissolving dried, fat free lactalbumin in an excess of a solution of fixed alkali, neutralizing the solution, precipitating the lactalbumin by means of an acid, separating the precipitate from the liquid, washing the freshly precipitated lactalbumin with water, freeing it from the water, suspending it in alcohol, adding a concentrated aqueous solution of fixed alkali containing a chemically equivalent quantity for binding the lactalbumin, removing the alcohol solution when it is neutral by pressure, removing the traces adhering to the compound by ether and allowing the ether to evaporate.

3. The process of producing a neutral sodium salt of lactalbumin, consisting in dissolving dried, fat free lactalbumin in an excess of a solution of sodium hydroxid, precipitating the lactalbumin with hydrochloric acid, separating the precipitate, washing it with water, freeing it from the water, suspending it in alcohol, adding a concentrated aqueous solution of sodium hydroxid containing a chemically equivalent quantity for binding the lactalbumin and removing the alcohol when neutral.

4. The process of producing a neutral sodium salt of lactalbumin, consisting in dissolving and reprecipitating the lactalbumin, separating the freshly precipitated lactalbumin from the liquid and washing it with water, freeing it from water, suspending it in alcohol, adding a concentrated aqueous solution of sodium hydroxid containing a chemically equivalent quantity for binding the lactalbumin, and removing the alcohol when neutral.

5. The process of producing a neutral sodium salt of lactalbumin, consisting in washing the freshly precipitated lactalbumin with water, freeing it from the water, suspending it in alcohol, adding a concentrated aqueous solution of sodium hydroxid containing a chemically equivalent quantity for binding the lactalbumin and removing the alcohol when neutral.

Signed at Berlin, Germany, this 7th day of October, 1908.

ERNST FISCHER.
PETER BERGELL.

Witnesses:
HENRY HASPER,
WOLDEMAR HAUPT.